United States Patent [19]

Aker et al.

[11] Patent Number: 4,828,639
[45] Date of Patent: May 9, 1989

[54] ELASTOMERIC BALL PRESSURIZING METHOD FOR ADHESIVE BONDING OF ASSEMBLIES

[75] Inventors: Sam C. Aker, Arlington; Jay W. Jackson, Alvarado; Pettice M. Phillips, Bedford, all of Tex.

[73] Assignee: Lockheed Corporation, Calabasas, Calif.

[21] Appl. No.: 89,436

[22] Filed: Aug. 26, 1987

[51] Int. Cl.⁴ .............................................. B32B 31/20
[52] U.S. Cl. ................................ 156/245; 156/285; 156/382; 264/314; 264/570; 425/405.1; 425/405.2
[58] Field of Search ............... 156/145, 156, 245, 285, 156/382; 264/119, 120, 121, 570, 314; 425/405.1, 405.2

[56] References Cited

U.S. PATENT DOCUMENTS

| | | | |
|---|---|---|---|
| 1,572,936 | 2/1926 | Kemp | 264/570 |
| 3,249,964 | 5/1966 | Shaler | 425/405.2 |
| 4,210,621 | 7/1980 | Snover et al. | 264/570 |
| 4,264,556 | 4/1981 | Kumar et al. | 425/405.2 |
| 4,704,240 | 11/1987 | Reavely et al. | 264/314 |

*Primary Examiner*—Caleb Weston
*Attorney, Agent, or Firm*—Robert P. Barton; Eric R. Katz

[57] ABSTRACT

An improved method for forming an assembly of laminated materials is provided. The method eliminates an necessity to evacuate a package or position the assembly in an autoclave for forming. In the method, the assembly (14, 70) is positioned against the die face of a rigid die (12, 72). A cavity of essentially constant volume is formed about the die and assembly and encloses the side of the assembly opposite that in contact with the rigid die. The cavity is filled with expandable spheroids (56). The spheroids are expanded to provide the necessary force on the assembly to urge the assembly against the rigid die to form the completed assembly. Preferably, the expandable spheroids (56) are thermally expandable and can comprise, for example, silicone rubber having a coefficient of thermal expansion of about $50 \times 10^{-5}$ inches per inch per degree Fahrenheit.

14 Claims, 1 Drawing Sheet

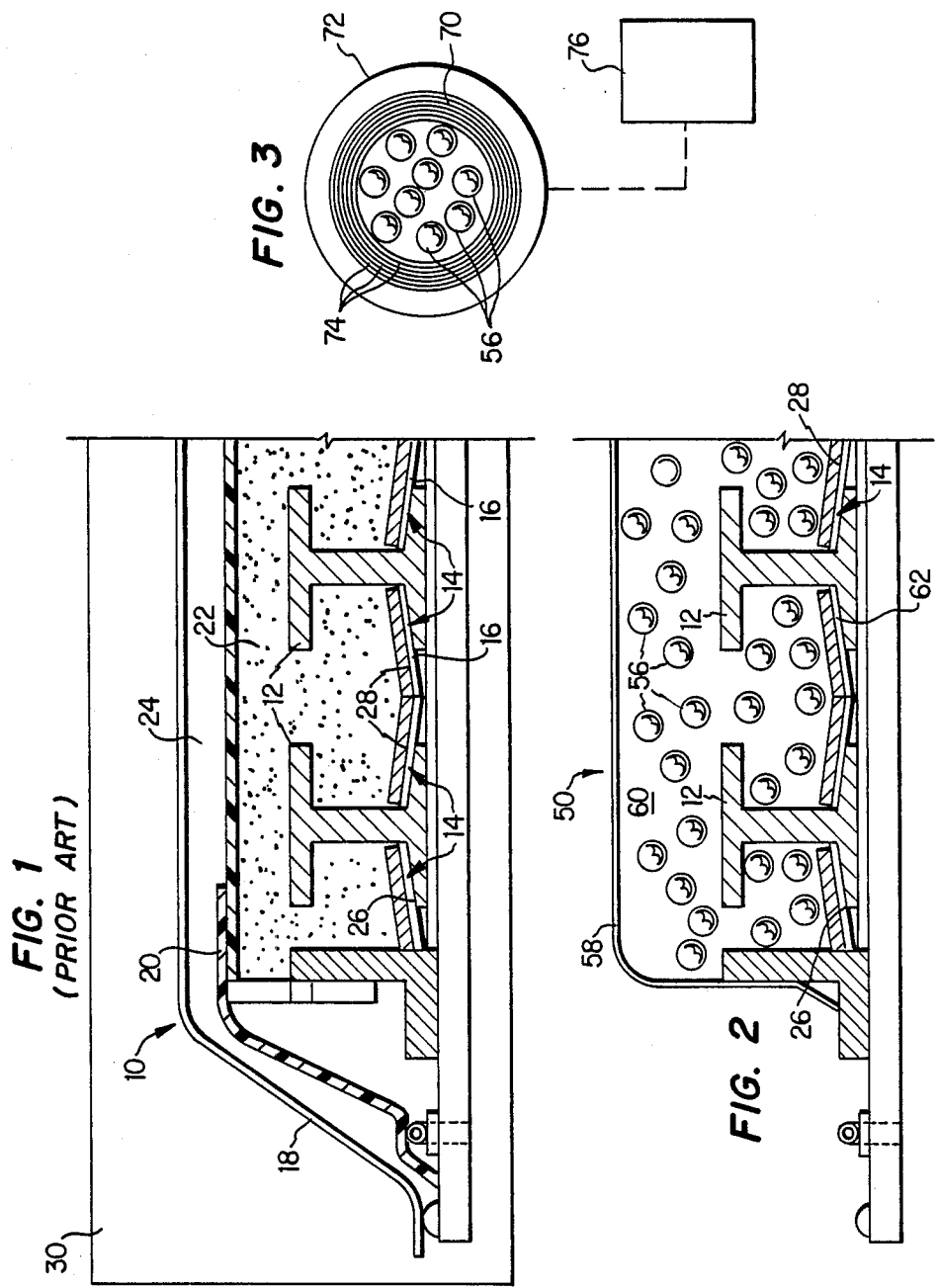

ELASTOMERIC BALL PRESSURIZING METHOD FOR ADHESIVE BONDING OF ASSEMBLIES

TECHNICAL FIELD

This invention relates to the adhesive bonding of laminated composite materials under pressure.

BACKGROUND OF THE INVENTION

Laminated composite assemblies are frequently used in aircraft construction, and have branched into other areas of technology as well. Typically, the laminated composite assembly is formed of various laminates of a material, such as carbon fiber, which are formed into a single assembly under pressure and heat with the laminates being bonded by a resin. The resulting assembly provides great strength while also having great flexibility and light weight.

In the past, the materials have been placed between two rigid formed dies to provide the proper compression to form the final assembly. However, the making of a male and female mating die set is very costly and becomes prohibitive for small production runs of a particular assembly.

In another technique, a single die is employed which has a formed die face. The materials to be laminated are positioned on the die face and the assembly is encased within an air tight container, commonly a flexible plastic like material. The space between the bag and the materials to be laminated is filled with a number of hard balls, commonly made of aluminum. A vacuum is drawn from the bag so that the exterior pressure forces the bag against the balls, and the balls in turn provide a relatively uniform pressure acting against the materials to be laminated and forces those materials against the die face. The effect can be enhanced by placing the entire package within an autoclave and increasing the exterior pressure acting on the bag. The autoclave can also be heated to provide activation of the resin binding the material, forming the final assembly.

However, the use of a vacuum bag has substantial disadvantages. Most significantly, if any leak develops through the bag, the interior of the bag will be pressurized to the pressure of the autoclave, eliminating the pressure differential necessary for proper pressure lamination of the materials. Therefore, an improved method of forming such assemblies is desirable.

SUMMARY OF THE INVENTION

In accordance with one aspect of the present invention, a method of forming an assembly of laminated materials is provided. The method includes the step of placing a first face of the assembly of materials to be laminated against the face of a rigid molding die. The method further includes the step of positioning a plurality of expandable spheroids against the opposite face of the assembly and confining the assembly and spheroids within a predetermined volume. Finally, the method includes the step of expanding the spheroids within the volume to exert a force on the assembly to form the laminated assembly against the rigid molding die.

In accordance with another aspect of the present invention, the spheroids have a coefficient of thermal expansion exceeding the materials of the assembly and the step of expanding the spheroids includes the step of heating the spheroids to a temperature sufficient so that the thermal expansion thereof provides the necessary forming forces. In one embodiment, the spheroids are formed of silicone rubber.

In yet another aspect of the present invention, the method can comprise the step of selecting spheroid dimensions for a pattern dispersal of the spheroids against the assembly to vary the forces exerted on the assembly.

BRIEF DESCRIPTION OF THE DRAWINGS

With reference now to the following Detailed Description, taken in conjunction with the accompanying Drawings, wherein:

FIG. 1 illustrates the prior art technique of forming an assembly of laminated materials;

FIG. 2 illustrates one embodiment of the present invention for forming an assembly of laminated materials; and FIG. 3 illustrates a second embodiment of the present invention for forming an assembly of laminated materials in tube form.

DETAILED DESCRIPTION

With reference now to the drawings, wherein like reference numerals designate like or corresponding parts throughout several views, the prior art technique of assembly forming and one embodiment of the present invention are illustrated.

FIG. 1 illustrates the prior art forming technique. The technique requires the formation of a package 10 which includes the rigid forms 12, the assembly 14 of materials 16 to be laminated and a bagging film 18 which permits the volume therewithin, containing the rigid dies 12 and assembly 14, to be evacuated. Typically, a porous fiberglass bleeder sheet 20 and spheres 22, usually of aluminum, are enclosed within the volume defined by the bagging film 18.

As the volume 24 within the bagging film 18 is evacuated, the air trapped between the spheres 22 bleeds out through the sheet 20 while sheet 20 contains the spheres 22. As the relative pressure difference between atmospheric pressure and the evacuated volume 24 increases, the external air pressure forces the film 18 against sheet 20. Sheet 20 then transfers the force to spheres 22 and the spheres 22 tranfer the force against the backside of the assemblies 14 to urge the assemblies against the faces 26 of the dies 12. As shown, a pressure intensifier 28 can be incorporated between the spheres 22 and the assemblies 14 to direct the forces caused by the pressure differential to particular areas of the assembly 14 to be laminated.

Typically, once volume 24 is evacuated, the entire package 10 is placed within an autoclave 30 and the interior of the autoclave 30 is pressurized and heated. The pressurization increases the forces acting through spheres 22 to force the assemblies 14 against the faces 26 while the heat cures the resin employed to bind the material 16 into the final laminated composite assembly 14.

As noted previously, the prior art technique includes several disadvantages. The volume 24 must be made air tight. Otherwise, the pressure within the autoclave will simply leak into the volume 24 over time, reducing the force exerted on the assemblies 14 through spheres 22 to zero and providing inadequate bonding of the assemblies.

A first embodiment of the present invention is illustrated in FIG. 2 and forms a package 50. The package 50 also incorporates rigid dies 12, each having a die face 26. The assemblies 14 are positioned so that a first face of each assembly 14 to be formed lies against a die face 26. The opposite face 54 of each assembly 14 is covered with a plurality of expandable spheroids 56. The dies 12, assemblies 14 and spheroids 56 are contained within a pressure resisting container 58 which defines a volume 60. The container 58 is formed of sufficiently strong material so that the volume 60 remains essentially constant.

In the method of the present invention, the expandable spheroids 56 are expanded within the volume 60 to create the necessary force to urge assemblies 14 against the dies 12 for proper formation of the completed assembly. The spheroids 56 can be thermally expandable or expandable by any other suitable technique. Thus, the method does not require the use of a sealed pressure bag. And, the present method provides a method for molding without an autoclave where the only previous technique was to use expensive and complex dedicated close tolerance cast to shape mating die pieces.

In the preferred embodiment, the expandable spheroids 56 are formed of rubber balls having a high coefficient of thermal expansion. For example, silicone rubber balls having a coefficient of thermal expansion of $50 \times 10^{-5}$ inches per inch per degree Fahrenheit would be suitable. While the dimensions of the spheroids would vary with the particular application, a spheroid of ¼ inch diameter is believed to be a good universal size for many applications. When used with dies formed of steel, having a coefficient of thermal expansion of only 5 to $6 \times 10^{-5}$ inches per inch per degree Fahrenheit, or aluminum having a coefficient of thermal expansion of about $12 \times 10^{-5}$ inches per inch per degree Fahrenheit, elevation of the temperature of package 50 clearly causes the rubber to expand at a greater rate than the die and the force created can thus be controlled by simply varying the temperature of the package.

With reference to FIG. 3, the improved method is illustrated for use in forming a tubular assembly 70. The die 72 is a cylinder having an internal diameter corresponding with the desired external diameter of the tubular assembly 70. The assembly 70, comprising the laminates of material 74 forming the assembly and uncured resin is placed within the die 72. Then, the interior of the assembly is filled with expandable spheroids 56 and the ends of die 72 are capped by caps 76 to contain the spheroids. Upon heating the package formed thereby, the spheroids expand at a faster rate than the die 72 and assembly 70, thus furnishing the internal pressure necessary to force the materials together and against the inner surface of the die 72 to form the bonded assembly. The pressure is relieved when the package is cooled. The end caps 76 can then be removed, the spheroids emptied from the assembly and the completed assembly removed from the die.

The improved method thus provides an internal pressure medium for bonded assemblies, with no vacuum bags to leak, and which does not require an autoclave to achieve bonding pressure. The pressure is, in effect, hydraulic, or fluid pressure, expanding from the spheroids in all directions more of less equally, depending on the shape or configuration of the assembly and the size and consistency of the spheroids.

The pressure can be varied and controlled not only by controlling the temperature, but by preloading the spheroids by stuffing or otherwise forcing more spheroids into the volume than are required to simply fill the volume. The pressure can also be varied by using rubber spheroids of different "durometer" (hardness). Also, the compounding of the rubber material from which the rubber spheroids are made, or the conditions of cure or "vulcanization" of the compound, can be used to vary the pressure.

The forces forming the molded assembly can also be tailored by using spheroids of different sizes to fill the available volume. Smaller spheres can be used in an area where greater forces are required, because a greater force would be exerted by the greater number of smaller diameter spheroids.

In certain applications, the individual spheroids may form dimples in the surface of the assembly where the spheroids contact the assembly. This effect can be greatly reduced by the use of an expandable or collapsible caul sheet which is interposed between the spheroids and the surface of the assembly. Such a caul sheet is illustrated in FIG. 2 as sheet 62.

The present method adds further improvements over a prior art dual die design requiring a hollow cavity to be formed in the assembly. Such cavities are usually formed by a plug of dimensions equal to the desired cavity. In the case where an exact, or even approximately shaped die, whether of metal or rubber, is required to act against the assembly to urge the assembly against the other die, a relatively large access hole must be provided in the completed assembly for removal of the plug. In contrast, the use of a plurality of small, expandable spheroids 56 requires only a very small access hole to the interior of the assembly being formed. Further, a solid plug will quickly wear to the point of being unusable With the expandable spheroids, those spheroids which have aged from repeated thermal and pressure cycles can be discarded and replaced by new balls. Alternatively, the general decrease of expandability of used spheroids can be supplemented simply by adding more balls into the available volume to maintain the total expansion of all the spheroids at a uniform level. Also, the use of discrete expandable spheroids 56 ensures that the spheroids will easily deform into the interstitial voids created by the nesting of the spheroidal shapes to prevent development of a transient point of high force such as can exist in solid rubber plug mandrel designs and result in premature degradation of the solid rubber mandrel.

While several embodiments of the present invention have been described in detail herein and shown in the accompanying drawings, it will be evident that further modifications or substitutions of parts and elements are possible without departing from the scope and spirit of the invention.

We claim:

1. An improved method for bonding an assembly of laminated material comprising the steps of:
    placing a first face of the assembly of materials to be laminated against the face of a rigid molding die;
    positioning a plurality of expandable spheroids against the opposite face of the assembly;
    confining the assembly and spheroids within a predetermined volume; and
    expanding the spheroids to form the assembly against the rigid molding die.

2. The improved method of claim 1, wherein the spheroids are thermally expandable and the step of expanding the spheroids comprises the step of heating the expandable spheroids to a temperature sufficient to provide the force to form the assembly against the rigid molding die.

3. The method of claim 1, wherein the expandable spheroids are formed of silicone rubber.

4. The method of claim 1, wherein the expandable spheroids have a diameter of approximately ¼ inch.

5. The improved method of claim 1, wherein said expandable spheroids are thermally expandable and have coefficient of thermal expansion of about $50 \times 10^{-5}$ inches per inch per degree Fahrenheit.

6. The method of claim 1, wherein the expandable spheroids have different dimensions and are positioned to provide a desired force pattern against the assembly.

7. An improved method for bonding an assembly of laminated materials against the face of a rigid molding die, comprising the steps of:
  positioning a first face of the assembly of materials against the die face of the rigid molding die;
  forming an enclosed cavity between the die and assembly enclosing the side of the assembly opposite the first side in contact with the die;
  filling the cavity with a plurality of expandable spheroids; and
  expanding the spheroids within the cavity to create a force on the assembly to urge the assembly against the rigid molding die to form the laminated assembly.

8. The method of claim 7, wherein said expandable spheroids are expanded by raising the temperature of the spheroids.

9. The method of claim 8, wherein said spheroids are formed of rubber having a coefficient of thermal expansion of about $50 \times 10^{-5}$ inches per inch per degree Fahrenheit.

10. The method of claim 7, wherein spheroids of different dimensions are positioned in the cavity to provide a desired force pattern on the assembly.

11. The method of claim 7, further comprising the step of adding sufficient expandable spheroids to the cavity as the method is practiced and the spheroids loose expandability to ensure maintenance of a desired force on the assembly.

12. An improved method for forming an assembly of laminated material within a die defining a cylindrical wall comprising the steps of:
  positioning the assembly to be formed within the die;
  filling the interior of the assembly with a plurality of expandable spheroids;
  capping the ends of the cylinder and the die; and
  expanding the spheroids to form the assembly against the inner surface of the die.

13. The method of claim 12, the spheroids are thermally expanded.

14. The method of claim 13, wherein the spheroids are silicone rubber.

* * * * *